(12) United States Patent
Ogawa

(10) Patent No.: US 8,144,388 B2
(45) Date of Patent: Mar. 27, 2012

(54) DISPLAY APPARATUS AND DISPLAY SHEET

(75) Inventor: Satoshi Ogawa, Shioziri (JP)

(73) Assignee: Seiko Epson Corporation, Tokyo (JP)

( * ) Notice: Subject to any disclaimer, the term of this patent is extended or adjusted under 35 U.S.C. 154(b) by 62 days.

(21) Appl. No.: 12/789,995

(22) Filed: May 28, 2010

(65) Prior Publication Data

US 2010/0309542 A1  Dec. 9, 2010

(30) Foreign Application Priority Data

Jun. 4, 2009 (JP) ................... 2009-135056
Apr. 9, 2010 (JP) ................... 2010-090702

(51) Int. Cl.
  *G02B 26/00* (2006.01)

(52) U.S. Cl. ...................... 359/296; 359/290

(58) Field of Classification Search .................. 359/290, 359/295–298
See application file for complete search history.

(56) References Cited

U.S. PATENT DOCUMENTS

| 2002/0141801 | A1 | 10/2002 | Shimoda et al. | |
| 2004/0247360 | A1 | 12/2004 | Shimoda et al. | |
| 2005/0122564 | A1* | 6/2005 | Zehner et al. | 359/296 |
| 2006/0210339 | A1 | 9/2006 | Shimoda et al. | |
| 2008/0180785 | A1* | 7/2008 | Schmitz | 359/296 |
| 2008/0239461 | A1* | 10/2008 | Maeda | 359/296 |

FOREIGN PATENT DOCUMENTS

JP    A-2000-127478    5/2000

* cited by examiner

*Primary Examiner* — Ricky Mack
*Assistant Examiner* — Mahidere Sahle
(74) *Attorney, Agent, or Firm* — Oliff & Berridge, PLC

(57) ABSTRACT

A display apparatus includes: an electrode layer; a display layer that is provided on the electrode layer, and that includes a plurality of containers containing at least one of positively charged first particles and negatively charged second particles; a film provided on the display layer; and a movable electrode portion capable of applying voltage to part of a region of the display layer through the film, the film being a conductive film having lower conductivity in a planar direction than in a thickness direction of the film.

15 Claims, 11 Drawing Sheets

DISPLAY APPARATUS AND DISPLAY SHEET

This application claims priority to Japanese patent applications No. 2009-135056 filed Jun. 4, 2009 and Japanese patent applications No. 2010-090702 filed Apr. 9, 2010, and the said applications are herein incorporated in the present specification.

BACKGROUND

1. Technical Field

The present invention relates to a display apparatus and a display sheet.

2. Related Art

Electrophoretic displays that utilize the electrophoresis of particles are known to be used for, for example, the image display unit of electronic paper (see, for example, JP-A-2000-127478 (Patent Document 1)). Electrophoretic displays excel in portability and power consumption, and are therefore particularly suitable as the image display unit of electronic paper.

Patent Document 1 discloses an electronic paper that includes a paper and a display layer (electronic ink layer) provided on one surface of the paper. The display layer is realized by a plurality of micro capsules filled with a dispersion liquid of electrophoretic particles, and a binder that holds the micro capsules together.

Patent Document 1 also discloses a printer used to write desired image on the electronic paper. The printer includes a pair of opposing drums. One of the drums has pixel electrodes on the surface. A common electrode is formed on the surface of the other drum. The electronic paper is allowed to pass between the drums with the paper side facing the common electrode, and voltage is applied between the selected one or more of the pixel electrodes and the common electrode as the electronic paper passes through. In response to the applied voltage, the electrophoretic particles in the micro capsules directly below the pixel electrodes migrate, changing the display color in these portions. As a result, desired images such as characters and patterns are displayed on the electronic paper.

However, the electronic paper described in Patent Document 1 is problematic in that the surface of the display layer opposite from the paper side is exposed to outside. As such, the display layer (micro capsules) is susceptible to damage, and when it is damaged, the display characteristics of the electronic paper deteriorate. One way to solve this problem is to protect the display layer by forming, for example, a protective sheet on the surface of the display layer opposite from the paper side.

However, when the protective sheet is conductive, the whole region of the protective sheet is brought to the same electric potential in response to the voltage applied between the selected pixel electrodes and the common electrode as the electronic paper passes between a pair of drums, and as a result the electrophoretic particles migrate in all of the micro capsules of the display layer. In this case, attempts to display desired image on the electronic paper fail regardless of how the pixel electrodes are selected for voltage application based on calculations for displaying desired image.

On the other hand, when the protective sheet has an insulating property, current does not flow in the micro capsules in response to the applied voltage between the pixel electrodes and the common electrode, and desired image cannot be displayed on the electronic paper.

Thus, with the electronic paper of Patent Document 1, desired image cannot be displayed on the electronic paper while protecting the display layer.

SUMMARY

An advantage of some aspects of the invention is to provide a display apparatus and a display sheet with which clear image (desired image) can be displayed while preventing or suppressing damage to the display layer.

Such an advantage can be realized by the following aspects of the present invention.

According to an aspect of the invention, there is provided a display apparatus that includes:

an electrode layer;

a display layer that is provided on the electrode layer, and that includes a plurality of containers containing at least one of positively charged first particles and negatively charged second particles;

a film provided on the display layer; and a movable electrode portion capable of applying voltage to part of a region of the display layer through the film, the film being a conductive film having lower conductivity in a planar direction than in a thickness direction of the film.

By the provision of the film and the electrode layer, damage to the display layer can be prevented or suppressed. Further, current can be flowed in the thickness direction while preventing or suppressing it from flowing in the planar direction of the film in response to the voltage applied between the electrode portion and the electrode layer with the electrode portion in contact with the film. Thus, the activation of the containers (display color) can be controlled in narrower regions on the plane of the display layer. As a result, finer and clearer images can be displayed with improved resolution, and the display characteristics of the display apparatus can be improved.

In the display apparatus according to the aspect of the invention, it is preferable that the conductive film have an insulating property in the planar direction of the film.

In this way, current can be effectively prevented from flowing in the planar direction of the film. As a result, finer and clearer images can be displayed with improved resolution, and the display characteristics of the display apparatus can be improved.

In the display apparatus according to the aspect of the invention, it is preferable that the conductive film includes a plurality of separately provided conductive portions having conductivity, and an insulating portion that has an insulating property and that is provided between the conductive portions so as to insulate the conductive portions from each other.

In this way, the film portion having conductivity in the thickness direction and an insulating property in the planar direction can be realized easily and reliably.

In the display apparatus according to the aspect of the invention, it is preferable that the conductive portions be provided in a matrix.

In this way, the conductive portions can be evenly disposed over the whole region of the film on the film plane. There accordingly will be no non-uniformity in display characteristics at any part of the display layer. As a result, the display characteristics of the display apparatus can be improved.

In the display apparatus according to the aspect of the invention, it is preferable that the insulating portion form a grid, and that the conductive portions be provided in a plurality of spaces formed by the insulating portion.

In this way, the film having conductivity in the thickness direction and an insulating property in the planar direction can be realized easily and reliably. Further, the film has the conductive portions evenly disposed over the whole region of the film on the film plane.

In the display apparatus according to the aspect of the invention, it is preferable that the conductive portions each have a portion exposed from a display sheet to outside.

In this way, each conductive portion can contact the electrode portion when writing desired image in the display apparatus. Thus, current can be efficiently flowed in the containers corresponding conductive portions via the conductive portions in response to the voltage applied between the electrode portion and the electrode layer with the electrode portion in contact with the conductive portion. As a result, the first particles and/or the second particles can migrate in the containers more reliably while saving the driving power for the display apparatus.

In the display apparatus according to the aspect of the invention, it is preferable that the conductive portions correspond to the containers one to one.

In this way, the electric field generated between the electrode portion and electrode layer in response to the applied voltage between these electrodes can act on each container. This enables the activation of the containers to be independently controlled, making it possible to display finer and clearer images.

In the display apparatus according to the aspect of the invention, it is preferable that the film includes a first conductive portion and a second conductive portion that are made of a first material and separately provided from each other, and a third conductive portion that is made of a second material different from the first material and that is disposed between the first conductive portion and the second conductive portion, wherein the first conductive portion and the second conductive portion have higher conductivity than the third conductive portion.

In this way, the structure of the film can be simplified.

In the display apparatus according to the aspect of the invention, it is preferable that the film be light transmissive.

In this way, the state of the display layer (the state of the first particles and the second particles in each container), namely the displayed image (information) in the display apparatus can be visually recognized through the film.

In the display apparatus according to the aspect of the invention, it is preferable that the containers be capsules.

In this way, the display layer can have a certain degree of elasticity, and the pressure or some other external force exerted on the display layer can be effectively relieved or absorbed.

In the display apparatus according to the aspect of the invention, it is preferable that the display layer and the electrode layer be separable from each other.

The electrode layer is required for writing image in the display apparatus, but is not necessary for maintaining the image written into it. Thus, by making the electrode layer detachable with respect to the display layer, the display apparatus can be made lighter and more compact (thinner).

In the display apparatus according to the aspect of the invention, it is preferable that the electrode portion be provided at the apex portion of a pen-type input device.

In this way, characters or other information can be desirably drawn in the display apparatus in the same manner as drawing characters or other information on a sheet of paper with a pencil. This affords improved operability (operation feeling) for the display apparatus.

In the display apparatus according to the aspect of the invention, it is preferable to further include a voltage applying section that applies DC voltage between the electrode layer and the electrode portion.

In this way, the structure of the apparatus can be made simpler than, for example, the structure in which AC voltage is applied. Further, the control is simpler. The response speed of display color switching can also be increased compared with the structure that employs AC voltage application.

According to another aspect of the invention, there is provided a display sheet that includes:

a display layer including a plurality of containers containing at least one of positively charged first particles and negatively charged second particles; and a film provided on the display layer, wherein the film is a conductive film having lower conductivity in a planar direction than in a thickness direction of the film.

By the provision of the film and the electrode layer, damage to the display layer can be prevented or suppressed. Further, current can be flowed in the thickness direction while preventing or suppressing it from flowing in the planar direction of the film. Thus, the activation of the containers (display color) can be controlled in narrower regions on the plane of the display layer. As a result, finer and clearer images can be displayed with improved resolution, and the display characteristics of the display sheet can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

A display apparatus and a display sheet of the present invention are described below based on the preferred embodiments represented in the accompanying drawings.

First Embodiment

First Embodiment describes a display apparatus of the present invention that uses a display sheet (a display sheet of the present invention).

Figure 1:
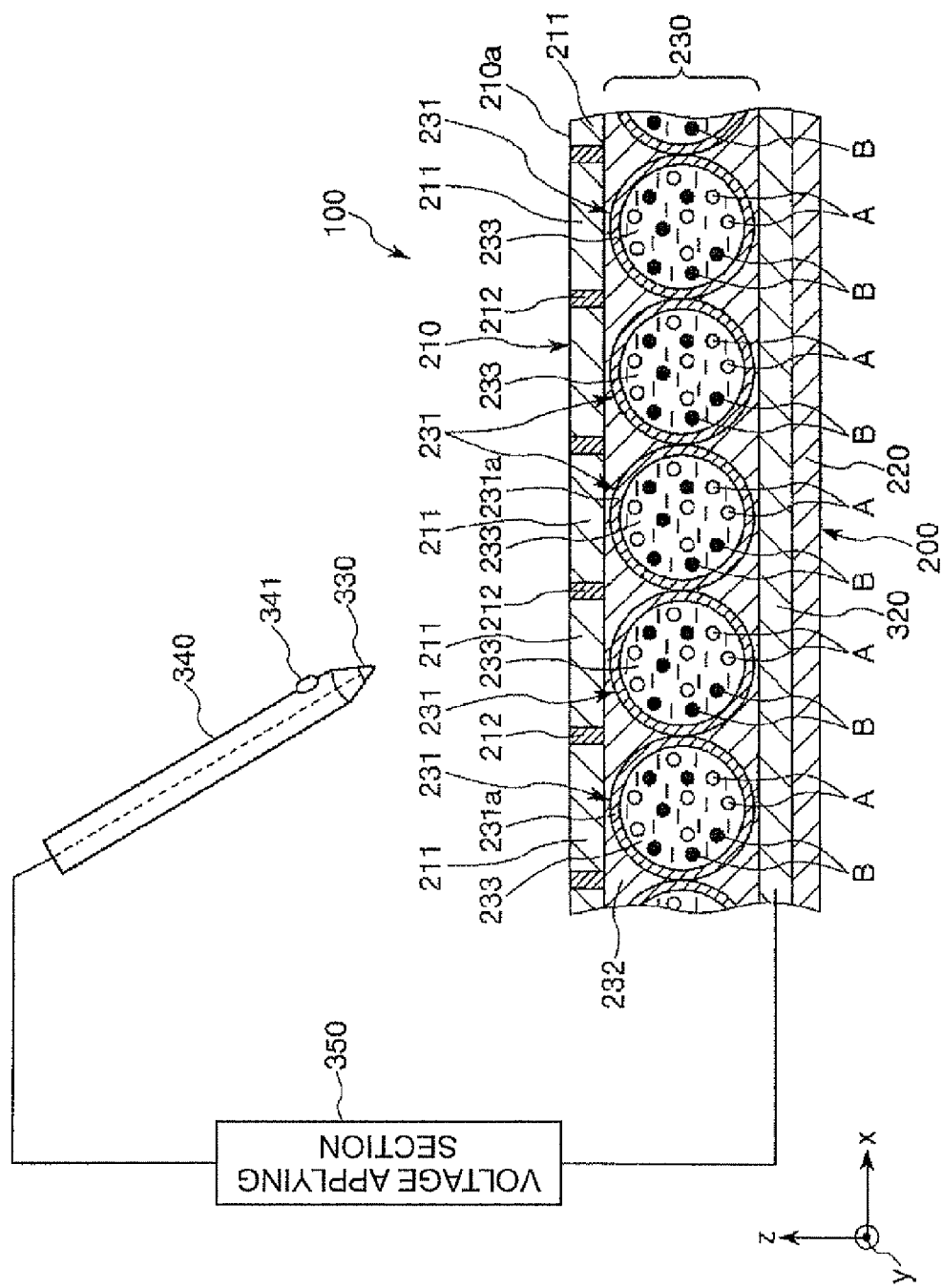
FIG. 1 is a cross sectional view schematically illustrating First Embodiment of a display apparatus of the present invention.
Figure 2:
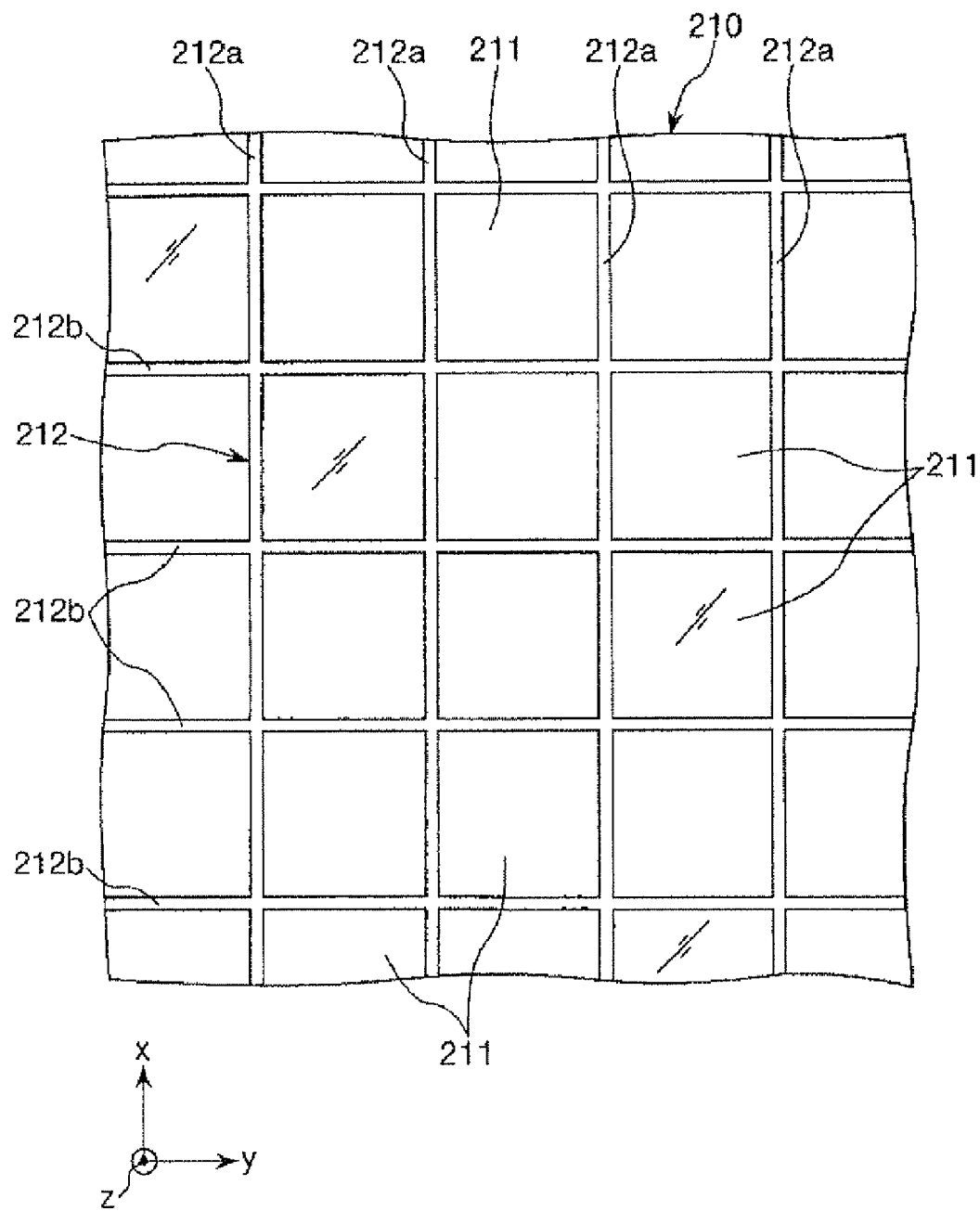
FIG. 2 is a plan view (top view) of the display apparatus illustrated in FIG. 1.
Figure 3A:
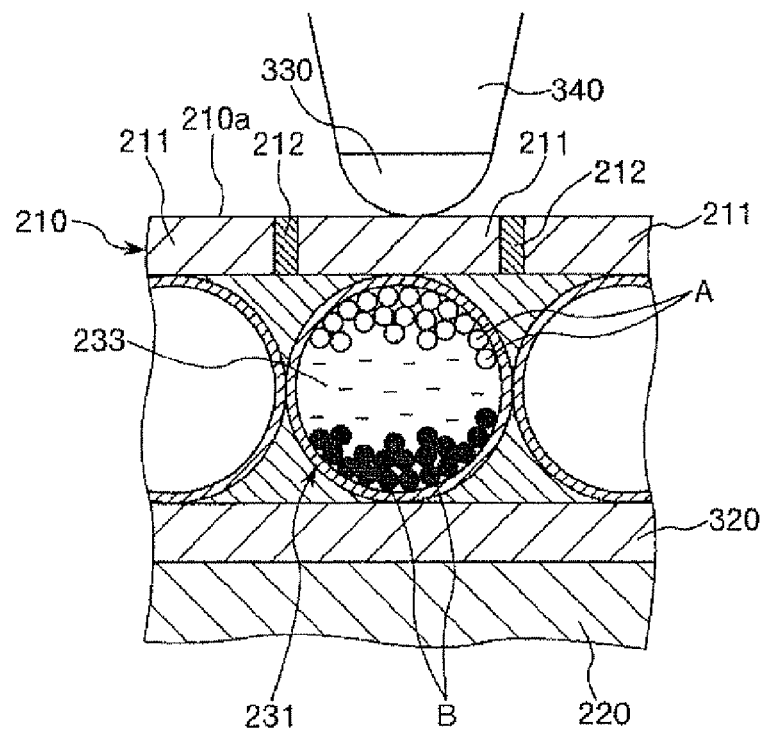
FIGS. 3A and 3B are views representing the activation of the display apparatus illustrated in FIG. 1.
Figure 3B:
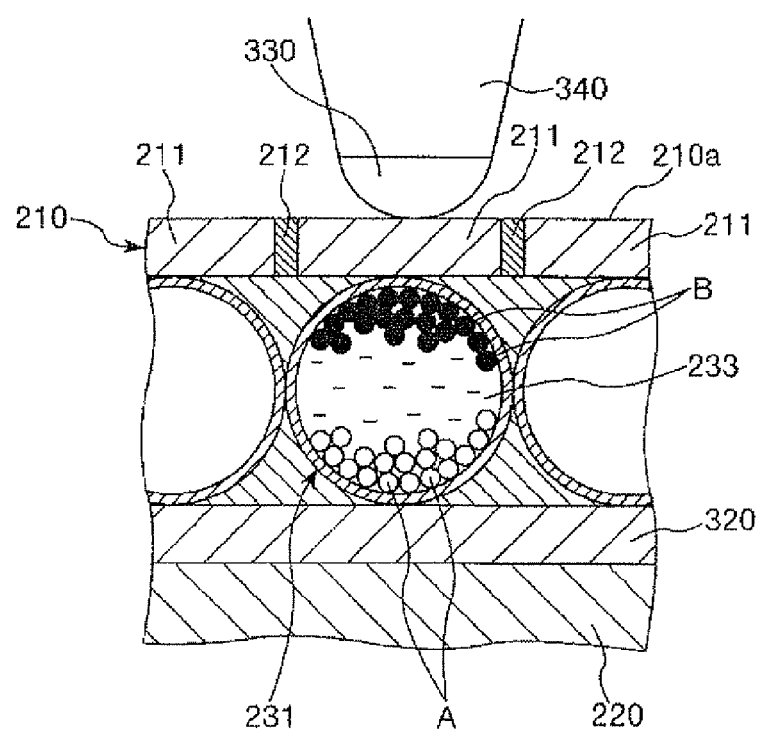
Figure 4:
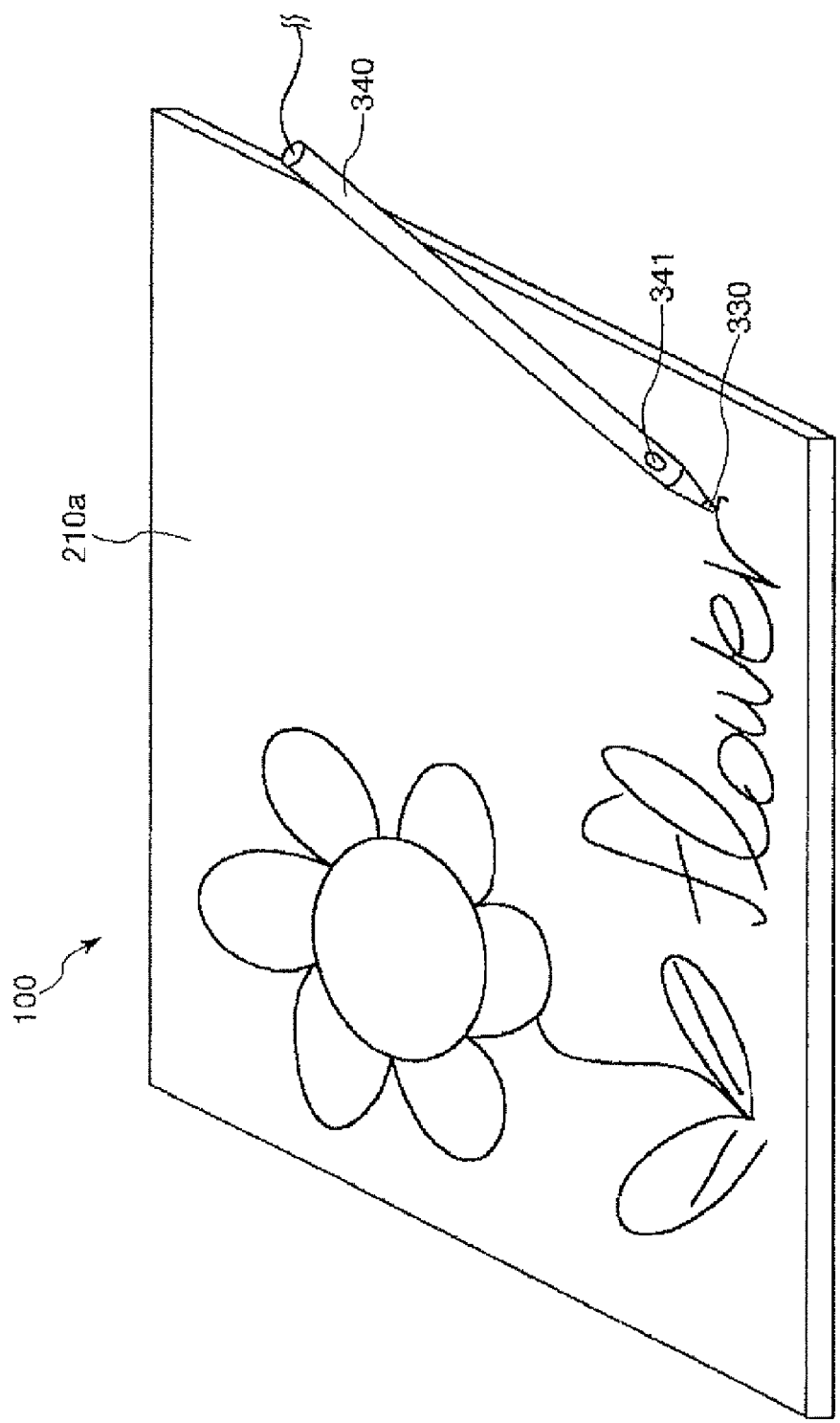
FIG. 4 is a view illustrating a display apparatus with a desired image written into it.

FIG. 1 is a cross sectional view schematically illustrating First Embodiment of a display apparatus of the invention. FIG. 2 is a plan view (top view) of the display apparatus illustrated in FIG. 1. FIGS. 3A and 3B are diagrams representing activation of the display apparatus illustrated in FIG. 1. FIG. 4 is a diagram representing a display apparatus with a desired image written into the apparatus. FIGS. 5A to 5C and FIGS. 6A and 6B represent a manufacturing process of the display apparatus illustrated in FIG. 1. In the following, for ease of explanation, the upper side and the lower side of FIG. 1, and FIGS. 3A and 3B to FIGS. 6A and 6B will be referred to as "upper" and "lower", respectively. Further, the three axes that cross as shown in FIG. 1 will be referred to as the x axis, y axis, and z axis, and the plane parallel to the upper surface of a display apparatus 100 (display face 210a) will be referred to as an xy plane.

The display apparatus 100 illustrated in FIG. 1 is an electrophoretic display apparatus that utilizes the electrophoresis of electrophoretic particles to display image. The display apparatus 100 includes a display layer 230, a first protective film (film) 210 provided on the upper side of the display layer 230, a common electrode (electrode layer) 320 provided on the lower side of the display layer 230, a second protective film 220 provided on the lower side of the common electrode 320, a writing pen 340 movable with respect to the first protective film 210, a partial electrode (electrode portion) 330 provided at the apex portion of the writing pen 340, and a voltage applying section 350 that applies voltage between the common electrode 320 and the partial electrode 330.

The display layer 230, the first protective film (film) 210, the common electrode (electrode layer) 320, and the second protective film 220 among these constituting elements of the display apparatus 100 form a display sheet 200. However, the configuration of the display sheet 200 is not limited to this, and, for example, a layer of some different material (for example, an adhesive layer formed of an adhesive) may be interposed between the display layer 230 and the first protective film (film) 210, between the display layer 230 and the common electrode 320, or between the common electrode 320 and the second protective film 220.

The display apparatus 100 is intended to draw desired characters and pictures therein with the writing pen 340. In the display apparatus 100, the upper surface of the first protective film 210 is the display face 210a, and a predetermined image can be recognized by viewing the display layer 230 through the display face 210a. Configured in this way, the display apparatus 100 can be used as rewritable paper, making the display apparatus 100 convenient to use.

Each element of the display apparatus 100 is described below in order.

As illustrated in FIG. 1, the display layer 230 includes a plurality of micro capsules (containers) 231 anchored (held) together with a binder 232. The micro capsules 231 are two-dimensionally disposed side by side in a single layer (only one micro capsule 231 in the thickness direction; not overlaid in this direction) between the first protective film 210 and the common electrode 320. It should be noted, however, that the micro capsules 231 may be disposed in a multilayer fashion, instead of being disposed in a single layer.

Each micro capsule 231 has a spherical capsule main body (shell) 231a filled with an electrophoresis dispersion liquid (filling the internal space). By being spherical, each micro capsule 231 can exhibit excellent pressure resistance and bleed resistance. Thus, for example, the micro capsules 321 can relieve or absorb the force applied thereon by the exerted pressure of the writing pen 340 on the display face 210a during writing. This effectively prevents the micro capsules 231 from being destroyed.

The material of the capsule main body 231a is not particularly limited. Examples include gelatin, composite material of gum arabic and gelatin, and various types of resin material such as urethane resin, melamine resin, urea resin, epoxy resin, phenol resin, acrylic resin, olefin resin, polyamide, and polyether. These can be used either individually or in combination of two or more.

The electrophoresis dispersion liquid filling the capsule main body 231a is the dispersion (suspension) of positively charged particles (first particles) A and negatively charged particles (second particles) B in a liquid-phase dispersion medium 233. The positively charged particles A and the negatively charged particles B can be dispersed in the liquid-phase dispersion medium 233 using methods, for example, such as a paint shaker method, a ball mill method, a media mill method, an ultrasonic dispersion method, and an agitation dispersion method, either individually or in combination of two or more.

Preferable examples of the liquid-phase dispersion medium 233 include aromatic hydrocarbons such as benzene hydrocarbons; paraffinic hydrocarbons such as n-hexane and n-decane; isoparaffinic hydrocarbons such as Isopar™ (ExxonMobil Chemical); olefinic hydrocarbons such as 1-octene and 1-decene; aliphatic hydrocarbons such as naphthenic hydrocarbons; petroleum and petroleum-derived hydrocarbon mixtures, such as kerosene, petroleum ether, petroleum benzin, ligroin, industrial gasoline, and petroleum naphtha; halogenated hydrocarbons such as dichloromethane and chloroform; silicone oils (organic silicone oils) such as dimethyl silicone oil and methylphenyl silicone oil; and fluoro solvents (organic fluoro solvents) such as hydrofluoroether. Among these, organic silicone oils are more preferable for ease of viscosity adjustment.

The positively charged particles A are white, positively charged electrophoretic particles. The negatively charged particles B are black, negatively charged electrophoretic particles. The use of the white, positively charged particles A and the black, negatively charged particles B enables the display apparatus 100 to perform black-and-white display, and improves the display contrast of the display apparatus 100.

In the present embodiment, white particles and black particles are used for the positively charged particles A and the negatively charged particles B, respectively. However, the colors of the positively charged particles A and the negatively charged particles B are not particularly limited, as long as they have different colors. For example, chromatic colors, such as red, blue, and green, and metallic gloss colors, such as gold and silver can be appropriately selected depending on intended use. Further, the combination of colors for the positively charged particles A and the negatively charged particles B is not limited to the example given above. For example, the positively charged particles A and the negatively charged particles B may be used in a combination of black and white, blue and red, or gold and silver, respectively.

Any particles can be used for the positively charged particles A and the negatively charged particles B, as long as they have a charge. The positively charged particles A and the negatively charged particles B are not particularly limited. Preferably, at least one of pigment particles, resin particles, and composite particles of these are used. These particles have advantages, including ease of production, and relative ease of controlling amounts of charge.

Examples of the pigment used for the pigment particles include black pigments such as aniline black, carbon black, and titanium black; white pigments such as titanium oxide and antimony oxide; azo pigments such as monoazo; yellow pigments such as isoindolinone and chrome yellow; red pigments such as quinacridone red and chrome vermilion; blue pigments such as phthalocyanine blue and indanthrene blue; and green pigments such as phthalocyanine green. These can be used either individually or in combination of two or more.

Among these pigment particles, the titanium oxide particles and the titanium black particles can be suitably used as the white particles and black particles, respectively. These particles have a good response to electric field and a large difference in reflectance, and therefore enable the display apparatus 100 to perform high contrast display.

Examples of the resin material for the resin particles include acrylic resin, urethane resin, urea resin, epoxy resin, polystyrene, and polyester. These can be used either individually or in combination of two or more.

The composite particles may be, for example, pigment particles coated with a resin material or other pigments, resin particles coated with a pigment, or particles of a pigment and a resin material mixed in an appropriate composition ratio.

The pigment particles coated with other pigments are, for example, titanium oxide particles coated with silicon oxide or aluminum oxide.

The shapes of the positively charged particles A and the negatively charged particles B are preferably spherical, but are not particularly limited.

Preferably, the positively charged particles A and the negatively charged particles B should be as small as possible when considering dispersibility in the liquid-phase dispersion medium 233. Specifically, the average particle size is preferably about 10 µm or more and about 500 µm or less, more preferably about 20 µm or more and about 300 µm or less. With these average particle size ranges of the positively charged particles A and the negatively charged particles B, there will be no agglomeration or sedimentation of the positively charged particles A and the negatively charged particles B, and the positively charged particles A and the negatively charged particles B can be kept dispersed in the liquid-phase dispersion medium 233. As a result, deterioration of display quality in the display sheet 200 can be desirably prevented.

When using two kinds of electrophoretic particles (positively charged particles A and the negatively charged particles B) as in the present embodiment, it is preferable to have average particle sizes different between the two kinds of particles, particularly a larger average particle size for the white positively charged particles A than for the black negatively charged particles B. In this way, the display contrast of the display apparatus 100 can be further improved, and the retention characteristic can be improved. Specifically, it is preferable that the black, negatively charged particles B have an average particle size of about 20 µm or more and about 100 µm or less, and that the white, positively charged particles A have an average particle size of about 150 µm or more and about 300 µm or less.

Further, the positively charged particles A and the negatively charged particles B preferably have specific gravities about the same as the specific gravity of the liquid-phase dispersion medium 233. In this way, the positively charged particles A and the negatively charged particles B can stay in specific positions in the liquid-phase dispersion medium 233 for extended time periods even after being acted upon by an electric field (described later).

One of the functions of the binder 232 is, for example, to anchor the micro capsules 231 between the first protective film 210 and the common electrode 320. This further improves the durability and reliability of the display apparatus 100.

Resin materials that excel in compatibility (adhesion) with the first protective film 210, the common electrode 320, and the capsule main body 231a, and that have excellent insulating properties are suitably used as the binder 232. Examples of such resin material for the binder 232 include polyacrylonitrile; polyethylene; polypropylene; polyethylene terephthalate; polycarbonate; nylon 66; urethane resin such as polyurethane; epoxide; polyimide; ABS resin; polyvinyl acetate; methacrylate ester resin such as polymethylmethacrylate, polyethylmethacrylate, polybutylmethacrylate, and polyoctylmethacrylate; vinyl chloride resin; cellulose resin; silicone resin; and ethylene-vinyl acetate copolymer. These can be used either individually or in combination of two or more.

The common electrode 320 is provided on the lower side of the display layer 230. The common electrode 320 is sheet-like in shape, covering substantially the whole region of the display layer 230 (the micro capsules 231) on the plane of the display layer 230 (in an xy planar view).

The material of the common electrode 320 is not particularly limited, as long as it is materially conductive. Examples of such conductive material include metallic material such as copper, aluminum, and an alloy containing these; carbon material such as carbon black; electrically conductive polymeric material such as polyacetylene, polyfluorene, and derivatives thereof; ion conductive polymeric material containing ionic material such as NaCl and $Cu(CF_3SO_3)_2$ dispersed in a matrix resin such as polyvinyl alcohol and polycarbonate; and conductive oxide material such as indium tin oxide (ITO). These can be used either individually or in combination of two or more.

The first protective film 210 and the second protective film 220 are provided on the upper side of the display layer 230 and the lower side of the common electrode 320, respectively. The first and second protective films 210 and 220 protect the display layer 230 and the common electrode 320, preventing or suppressing damage to the display layer 230 and the common electrode 320, and thus maintaining the display characteristics of the display apparatus 100. In this manner, the first and second protective films 210 and 220 serve to protect the display layer 230 and the common electrode 320. The first protective film 210 also serves to improve the display characteristics of the display apparatus 100, as will be described later.

The first and second protective films 210 and 220 may be flexible or hard, preferably flexible. When the first and second protective films 210 and 220 are flexible, the display apparatus 100 can be made flexible, making the display apparatus 100 more convenient to use.

Because the first protective film 210 has the display face 210a, the first protective film 210 is light transmissive, specifically materially transparent (colorless transparent, colored transparent, or semitransparent). In this way, the state of the display layer 230 (the state of the electrophoretic particles in each micro capsule 231), namely, the displayed image (information) on the display apparatus 100 can be visually recognized from the display face 210a side.

The first protective film 210 is realized by an anisotropic conductive film that is more conductive in the thickness direction (z axis direction) than in the planar direction (xy plane direction). In this way, as will be described later, current can be flowed in the thickness direction while preventing or suppressing it from flowing in the planar direction of the first protective film 210 in response to applied voltage between the partial electrode 330 and the common electrode 320 with the partial electrode 330 in contact with the first protective film 210. This enables the activation of the micro capsules 231 (migration of the electrophoretic particles, specifically the display color) to be controlled in narrower regions on the xy plane. As a result, finer and clearer images can be displayed with improved resolution, and the display characteristics of the display apparatus 100 can be improved.

In order to satisfy the foregoing characteristic (higher conductivity in the thickness direction than in the planar direction), the first protective film 210 of the present embodiment includes a plurality of conductive portions (including a first conductive portion and a second conductive portion) 211 having conductivity, and an insulating portion (third conductive portion) 212 that has an insulating property, and that is disposed between the conductive portions 211 to insulate the conductive portions 211 from each other. The conductive portions 211 and the insulating portion 212 are made of different materials.

The insulating portion 212 has a form of a grid on the plane of the first protective film 210, and the conductive portions 211 are provided in a plurality of spaces formed in the grid. Specifically, the insulating portion 212 is provided between the conductive portions 211 to insulate the conductive portions 211 from each other. Thus, the first protective film 210 has an insulating property in the planar direction, effectively preventing a current flow in the planar direction of the first protective film 210. As a result, finer and clearer images can be displayed with improved resolution, and the display characteristics of the display apparatus 100 can be improved.

Further, by providing the insulating portion 212 between the conductive portions 211 to insulate the conductive portions 211 from each other, the first protective film 210 can reliably have conductivity in the thickness direction and an insulating property in the planar direction with a simple structure.

Further, with such a configuration of the first protective film 210, the conductive portions 211 can be disposed in a matrix. Specifically, the conductive portions 211 can be evenly disposed throughout the first protective film 210 on the plane of the first protective film 210. This prevents non-uniform display characteristics in any part of the display face 210a (uniform display characteristics can be obtained throughout the display face 210a). As a result, the display characteristics of the display apparatus 100 can be improved.

The arrangement of the conductive portions 211 is not limited to a matrix. For example, the conductive portions 211 may be disposed in a honeycomb pattern. The effects obtained by the matrix arrangement also can be obtained in this case.

As illustrated in FIG. 1, it is preferable that the conductive portions 211 be disposed to correspond to the micro capsules 231. Specifically, it is preferable that the conductive portions 211 are disposed to correspond to the micro capsules 231 one to one. In this way, the electric field generated by the applied voltage between the partial electrode 330 and the common electrode 320 can act on each micro capsule 231. That is, the activation of the micro capsules 231 can be independently controlled, making it possible to display finer and clearer images and to improve the display characteristics of the display apparatus 100.

As illustrated in FIG. 1, it is not necessarily required that the conductive portions 211 are disposed to correspond to the micro capsules 231 one to one. The conductive portions 211 may be disposed so that each conductive portion 211 covers more than one micro capsule 231. In this case, the number of micro capsules 231 covered by each conductive portion 211 is preferably 2 or more and 1,000 or less, more preferably 2 or more and 100 or less, though not particularly limited. In this way, the manufacture of the display apparatus 100 in which the area of each conductive portion 211 can be increased in comparison with one conductive portion 211 provided for each micro capsule 231 can be simplified and reduced in manufacturing cost, while maintaining the display characteristics of the display apparatus 100.

Thus, it can be said that a single micro capsule 231 or a set of micro capsules 231 covered by a single conductive portion 211 constitutes a pixel in the display apparatus 100. Accordingly, each conductive portion 211 can be regarded as a conductive pad (pixel electrode) that corresponds to each pixel of the display apparatus 100.

The conductivity of the conductive portions 211 is preferably $10 \: \Omega^{-1} \cdot cm^{-1}$ or more, more preferably $10^5 \: \Omega^{-1} \cdot cm^{-1}$ or more, though not particularly limited. This saves the driving power for the display apparatus 100.

The material (first material) of the conductive portions 211 is not particularly limited as long as it is conductive. Examples of such conductive materials include metallic material such as copper, aluminum, and an alloy containing these; carbon material such as carbon black; electrically conductive polymeric material such as polyacetylene, polyfluorene, and derivatives thereof; ion conductive polymeric material containing ionic material such as NaCl and $Cu(CF_3SO_3)_2$ dispersed in a matrix resin such as polyvinyl alcohol and polycarbonate; and conductive oxide material such as indium tin oxide (ITO). These can be used either individually or in combination of two or more.

The insulating portion 212 parting the conductive portions 211 has a form of a grid, as described above. Specifically, the insulating portion 212 includes a plurality of first wall portions 212a that extends along the x axis direction, and a plurality of second wall portions 212b that extends along the y axis direction and crosses the first wall portions 212a. The distance between the adjacent first wall portions 212a is preferably 10 μm or more and 1 mm or less, more preferably 50 μm or more and 0.1 mm or less, though not particularly limited. The distance between the adjacent second wall portions 212b has the same range. In this way, the number of micro capsules 231 covered by each conductive portion 211 can be 1 or more and 1,000 or less (preferably 1 or more and 100 or less), as above.

The width of each first wall portion 212a (the length along the y axis direction) and the width of each second wall portion 212b (the length along the x axis direction) are preferably 1 μm or more and 1 mm or less, more preferably 5 μm or more and 0.1 mm or less, though not particularly limited. In this way, the mechanical strength of the insulating portion 212 can be maintained, and formation of defect portions, such as a pin hole (a through hole along the width direction), in the insulating portion 212 can be prevented. Accordingly, the adjacent conductive portions 211, that should be insulated by the insulating portion 212, will not be continuous via damaged or defect portions of the insulating portion 212, and deterioration of the display characteristics of the display apparatus 100 can be prevented.

Further, with the widths of the first wall portions 212a and the second wall portions 212b falling in the foregoing ranges, the area percentage of the insulating portion 212 with respect to the first protective film 210 can be reduced. This reduces the number of micro capsules 231 covered by the insulating portion 212, specifically the number of micro capsules 231 in which the migration of the positively charged particles A and the negatively charged particles B is unlikely to occur. As a result, deterioration of the display characteristics of the display apparatus 100 can be effectively prevented.

The area percentage of the insulating portion 212 with respect to the first protective film 210 on the plane of the first protective film 210 is preferably 0.1% or more and 20% or less, more preferably 1% or more and 10% or less, though not particularly limited. This reduces the number of micro capsules 231 covered by the insulating portion 212, specifically the number of micro capsules 231 in which the migration of the positively charged particles A and the negatively charged particles B is unlikely to occur. As a result, deterioration of the display characteristics of the display apparatus 100 can be effectively prevented.

The conductivity of the insulating portion 212 is not particularly limited, and is preferably $1/100$ or less of the conductivity of the conductive portions 211, specifically 10 $\Omega^{-10} \cdot cm^{-1}$ or less, more preferably 10 $\Omega^{-20} \cdot cm^{-1}$ or less. In this way, the conductive portions 211 can be insulated from each other more reliably in an ordinary range of the applied voltage (for example, about 1 to 100 V) between the partial electrode 330 and the common electrode 320.

Insulating material having an insulating property is used as the material (second material) of the insulating portion 212. Non-limiting examples of such insulating material include various resin materials such as epoxy resin, acrylic resin, urethane resin, melamine resin, and phenol resin; polyolefin or modified polyolefin such as polyethylene, polypropylene, and ethylene-vinyl acetate copolymer; polyamide (for example, nylon 6, nylon 66); various thermoplastic elastomers, for example, such as styrene, polyvinyl chloride, polyurethane, polyester, fluoro-rubber, and chlorinated polyethylene; and copolymers, blends, and polymer alloys primarily containing these materials. These can be used either individually or in combination of two or more.

Concerning the specific configuration of the first protective film 210 described above, the thickness of the first protective film 210 is preferably 10 μm or more and 1 mm or less, more preferably 50 μm or more and 0.1 mm or less, though not particularly limited. In this way, the resistance value of the conductive portions 211 along the thickness direction can be kept low while maintaining the mechanical strength of the first protective film 210. The display apparatus 100 which is made very reliable and in which the driving power can be saved can be obtained.

The first protective film 210 is provided in such a manner that its upper surface is exposed from the display apparatus 100 to outside. Accordingly, the upper surface of each conductive portion 211 is also exposed from the display apparatus 100 to outside, enabling the partial electrode 330 to contact the conductive portions 211 when writing a desired image on the display apparatus 100. Thus, current can be efficiently flowed into the micro capsules 231 via corresponding to conductive portions 211 upon applying voltage between the partial electrode 330 and the common electrode 320 with the partial electrode 330 in contact with the conductive portions 211. As a result, the positively charged particles A and the negatively charged particles B in the micro capsules 231 can migrate more reliably (display color can be switched) while saving the driving power for the display apparatus 100.

The first protective film 210 can be formed using, for example, an inkjet method, as follows. An insulating liquid droplet is ejected onto the upper surface of the display layer 230 in the planar shape of the insulating portion 212, and the liquid is dried to form the insulating portion 212. In the same manner, a conductive liquid droplet is ejected onto the upper surface of the display layer 320 in the planar shape of the conductive portions 211, and the liquid is dried to form the conductive portions 211, providing a first protective film 210. The inkjet method is very accurate, and therefore enables the first protective film 210 having the conductive portions 211 and the insulating portion 212 of a desired shape to be formed easily and accurately.

Unlike the first protective film 210, the second protective film 220 may or may not be light transmissive. Non-limiting examples of material for the second protective film 220 include polyolefin (for example, polyethylene), modified polyolefin, polyamide, thermoplastic polyimide, polyether, polyetheretherketone, various thermoplastic elastomers such as polyurethane and chlorinated polyethylene, and copolymers, blends, and polymer alloys primarily containing these materials. These may be used either individually or in combination of two or more.

The writing pen 340 is made from, for example, an insulating plastic material, and is held by a user to trace the display face 210a of the display apparatus 100. The partial electrode 330 is provided at the apex portion of the writing pen 340. Further, a button 341 is provided on the apex side of the writing pen 340. The button 341 is used to turn on and off the conduction between the voltage applying section 350 and the partial electrode 330.

Because the partial electrode 330 is provided on the writing pen 340, the partial electrode 330 can be said as being movable with respect to the display apparatus 100 (first protective film). By providing the partial electrode 330 at the apex portion of the pen-type input device in this manner, characters or other information can be desirably drawn on the display face 210a of the display apparatus 100 in the same manner as drawing characters or other information on a sheet of paper with a pencil. This affords improved operability (operation feeling) for the display apparatus 100.

The partial electrode 330 has a much smaller area (in a planar view) than the display face 210a of the display apparatus 100. Thus, the electric field generated by the applied voltage between the common electrode 320 and the partial electrode 330 by the voltage applying section 350 can act on only a part of the region of the display layer 230 (some of the micro capsules 231), and thus a user can freely write or draw images on the display apparatus 100 in the manner described below.

The area of the partial electrode 330 (the contact area with the display face 210a) is not particularly limited, and can be appropriately set depending on intended use. Reducing the area of the partial electrode 330 allows the drawing of thinner lines, and thus enables finer images to be drawn.

The material of the partial electrode 330 is not particularly limited, as long as it is materially conductive. For example, the materials used for the common electrode 320 can be used.

The voltage applying section 350 includes a DC power supply, and applies DC voltage between the common electrode 320 and the partial electrode 330.

Activation of Display Apparatus 100

The activation of the display apparatus 100 (switching of display colors) is described below with reference to FIGS. 3A and 3B. Note that, for convenience, the following description deals with only one of the micro capsules 231, and no explanation will be made for the other micro capsules 231, because the micro capsules 231 all have the same configuration.

FIGS. 3A and 3B illustrate the state of the partial electrode 330 in contact with one of the conductive portions 211 of the first protective film 210.

White Display Mode

A white display mode on the display face 210a is described first.

The voltage applying section 350 applies a first voltage (DC voltage) between the pair of the electrodes 320 and 330 such that the common electrode 320 side and the partial electrode 330 side have a positive electric potential and a negative electric potential, respectively. As a result, an electric field is generated with a positive electric potential on the common electrode 320 side and a negative electric potential on the partial electrode 330 side. The electric field acts on the micro capsule 231, and in response the positively charged particles A migrate (move) towards the partial electrode 330 side of a negative electric potential, while the negatively charged particles B migrate towards the common electrode 320 side of a positive electric potential.

The migration of the positively charged particles A and the negatively charged particles B creates an eccentric distribution of the positively charged particles A and the negatively charged particles B on the partial electrode 330 side and the common electrode 320 side, respectively, as illustrated in FIG. 3A. As a result, the color (white) of the positively charged particles A is displayed on the display face 210*a* (white display mode).

Black Display Mode

A black display mode on the display face 210*a* is described below.

The voltage applying section 350 applies a second voltage (DC voltage) between the pair of the electrodes 320 and 330 such that the common electrode 320 side and the partial electrode 330 side have a negative electric potential and a positive electric potential, respectively. As a result, an electric field is generated with a negative electric potential on the common electrode 320 side and a positive electric potential on the partial electrode 330 side. The electric field acts on the micro capsule 231, and in response the negatively charged particles B migrate towards the partial electrode 330 side of a positive electric potential, while the positively charged particles A migrate towards the common electrode 320 side of a negative electric potential.

The migration of the positively charged particles A and the negatively charged particles B creates an eccentric distribution of the positively charged particles A and the negatively charged particles on the common electrode 320 side and the partial electrode 330 side, respectively, as illustrated in FIG. 3B. As a result, the color (black) of the negatively charged particles B is displayed on the display face 210*a* (black display mode).

In the display sheet 200, the migration of the positively charged particles A (white particles) and the negatively charged particles B (black particles) is selected in each micro capsule 231, and desired information (image) can be displayed on the display face 210*a* based on the reflected light from the positively charged particles A and the negatively charged particles B.

During the application of the first or second voltage between the pair of the electrodes 320 and 330, current flows in the conductive portions 211 in contact with the partial electrode 330, but not in the conductive portions 211 not in contact with the partial electrode 330, because the conductive portions 211 are insulated from each other by the insulating portion 212. Thus, the positively charged particles A and the negatively charged particles B can move (migrate) only in the micro capsules 231 covered by the conductive portions 211 in contact with the partial electrode 330. The display apparatus 100 is therefore able to display finer and clearer images without color blur.

Further, because the voltage applying section 350 applies DC voltage between the pair of the electrodes 320 and 330, the structure of the apparatus can be made simpler than, for example, the structure in which AC voltage is applied. Further, the control is simpler. The response speed of display color switching can also be increased compared with the structure that employs AC voltage application.

In the display apparatus 100, for example, moving the writing pen 340 on the display face 210*a* under applied second voltage between the pair of the electrodes 320 and 330 over the background of the white display mode set for the whole region of the display face 210*a* (for all the micro capsules 231) switches the display mode to black in the micro capsules 231 that happen to reside on the lines traced (tracked) by the writing pen 340. As a result, black lines corresponding to the trace of the writing pen 340 are drawn on the display face 210*a*. In this way, the image illustrated in, for example, FIG. 4, can be drawn.

Such image writing is possible because each micro capsule 231 can maintain the state of the positively charged particles A and the negatively charged particles B long after being acted upon by the electric field (even after the voltage application is stopped).

When drawing characters that contain two or more lines or dots that start from different positions of the display face 210*a* (for example, characters such as the letters "T" and "X" that consists of two or more lines), it is preferable that the button 341 be used to cut the continuity between the voltage applying section 350 and the partial electrode 330 while the writing pen 340 is moved from the end point of a line to the start point of the next line. In this way, unintentional writing on the display apparatus 100 can be effectively prevented while moving the writing pen 340.

This completes the detailed description of the configuration and the activation of the display apparatus 100.

A manufacturing process of the display apparatus 100 is described below.

The manufacturing process of the display apparatus includes a first step of forming the display layer 230, and a second step of forming the first protective film 210 on the upper surface of the display layer 230.

1. First Step

Figure 5A:
FIGS. 5A to 5C are views representing a manufacturing process of the display apparatus illustrated in FIG. 1.
Figure 5B:
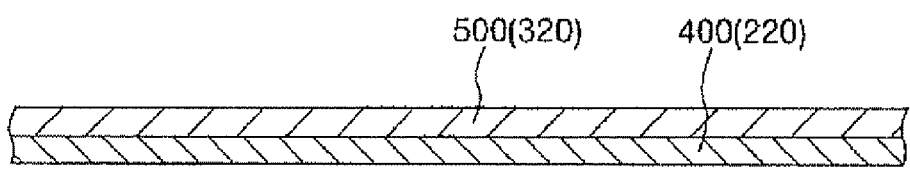

First, as illustrated in FIG. 5A, a sheet member 400 of a desired shape and size is prepared. The sheet member 400 becomes the second protective film 220, and as such the materials exemplified for the second protective film 220 are used as the material of the sheet member 400.

Then, as illustrated in FIG. 53, an electrode layer 500 is formed on the upper surface of the sheet member 400. The electrode layer 500 becomes the common electrode 320, and as such the materials exemplified for the common electrode 320 are used as the material of the electrode layer 500. The electrode layer 500 can be formed using known methods such as vacuum vapor deposition and sputtering (low-temperature sputtering).

Figure 5C:
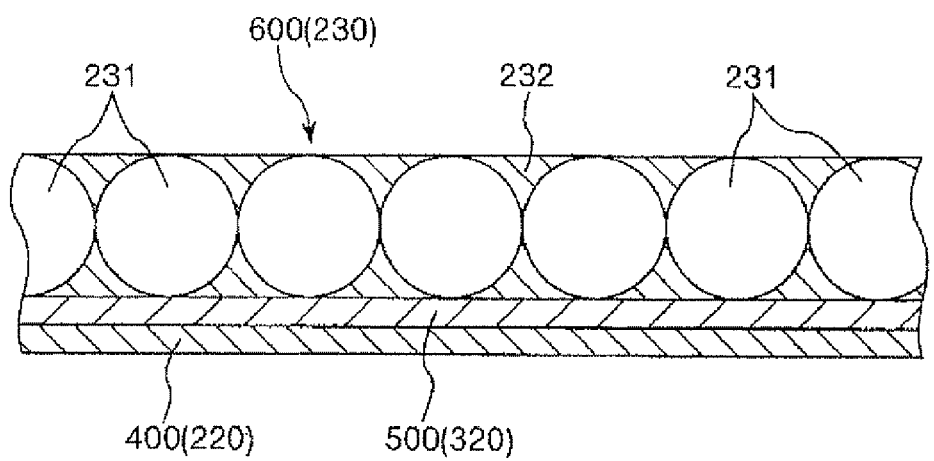

Next, as illustrated in FIG. 5C, a mixture 600 containing a solvent, the binder 232, and large numbers of micro capsules 231 is applied (supplied) onto the upper surface of the electrode layer 500. Here, as required, the mixture 600 on the electrode layer 500 may be leveled to provide a uniform thickness, using, for example, a squeegee (flat jig). Then, the solvent in the mixture 600 is removed by, for example, drying (natural drying, forced drying). As a result, the display layer 230 is obtained on the upper surface of the electrode layer 500.

2. Second Step

In the second step, the first protective film 210 is formed on the upper surface of the display layer 230 (the surface opposite from the second protective film 220), using an inkjet method (discharge method). Specifically, liquid droplets are ejected onto the upper surface of the display layer 230 through an inkjet head (not illustrated), and the liquid droplets on the upper surface of the display layer 230 are dried to form the first protective film 210 on the upper surface of the display layer 230.

The inkjet head may be one having substantially the same configuration as those commonly used in applications such as inkjet printers. To briefly describe the configuration of the inkjet head, the inkjet head includes, for example, a nozzle plate having one or more nozzle holes; a plurality of nozzle chambers in communication with the nozzle holes in a one-to-one correspondence; and a plurality of piezoelectric elements that cause the ink chambers to contract and expand. Contracting and expanding the ink chamber by the driving of the piezoelectric element varies the volume of the ink chamber, and as a result the ink filling the ink chamber discharges in droplets through the nozzle hole.

In the second step, an insulating ink (liquid) having an insulating property to form the insulating portion 212 is charged into the ink chamber. Alternatively, an inkjet head with an ink chamber filled with an insulating ink is prepared.

Figure 6A:
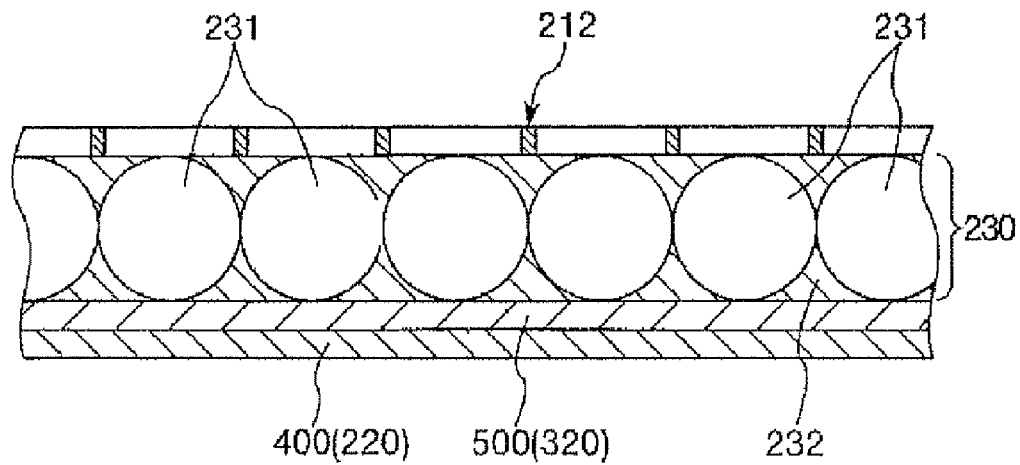
FIGS. 6A and 6B are views representing the manufacturing process of the display apparatus illustrated in FIG. 1.

The inkjet head discharges the insulating ink in a relative movement with the display layer 230, so as to apply the insulating ink on the upper surface of the display layer 230 in a shape corresponding to the planar shape of the insulating portion 212. The insulating ink applied to the display layer 230 is dried (natural drying, forced drying) to obtain the insulating portion 212 on the upper surface of the display layer 230, as illustrated in FIG. 6A. The thickness of the insulating portion 212 can be adjusted by appropriately changing the number of times the insulating ink is discharged and dried.

Thereafter, a conductive ink (liquid) having a conductive property to form the conductive portions 211 is charged into the ink chamber. Alternatively, an inkjet head with an ink chamber filled with a conductive ink is prepared.

Figure 6B:
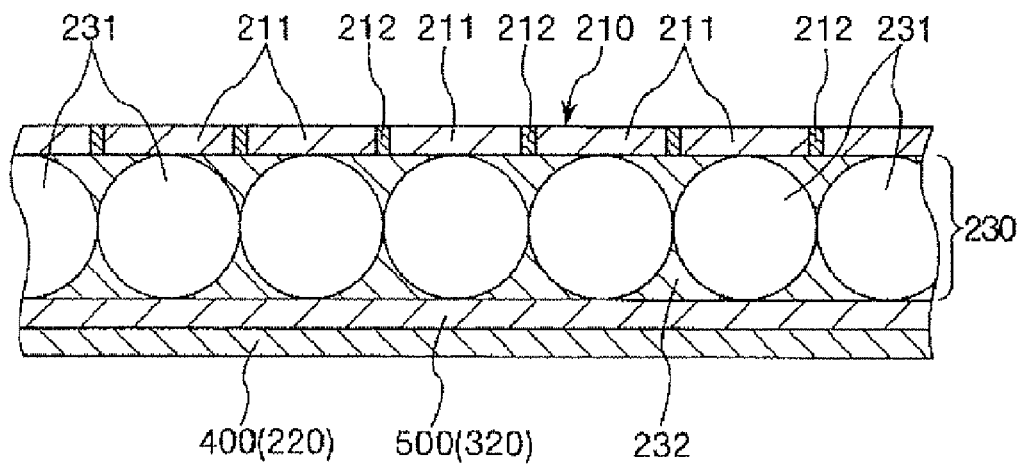

The inkjet head discharges the conductive ink in a relative movement with the display layer 230, so as to apply the conductive ink on the upper surface of the display layer 230 in a shape corresponding to the planar shape of the conductive portions 211. The conductive ink applied to the display layer 230 is dried (natural drying, forced drying) to obtain the conductive portions 211 on the upper surface of the display layer 230, as illustrated in FIG. 6B. The thickness of the conductive portions 211 can be adjusted by appropriately changing the number of times the conductive ink is discharged and dried.

As a result, the first protective film 210 is obtained on the upper surface of the display layer 230. The order of forming the insulating portion 212 and the conductive portions 211 is not particularly limited. The insulating portion 212 may be formed after the conductive portions 211 is formed, or the conductive portions 211 and the insulating portion 212 may be formed at the same time (concurrently).

Finally, the common electrode 320 and the writing pen 340 (separately prepared) are connected to the voltage applying section 350. This completes the manufacture of the display apparatus 100.

In the manufacturing process of the display apparatus 100, the inkjet method is used in the second step to form the first protective film 210. Because the inkjet method enables the ink droplets to accurately form spots at desired positions on the upper surface of the display layer 230, the conductive portions 211 and the insulating portion 212 of a desired shape (planar shape) can be formed more reliably.

Further, because the inkjet method enables the discharge of micro ink droplets (on the order of 1 to 10 pl), finer patterns can be formed. Thus, the conductive portions 211 and the insulating portion 212 can be accurately formed on the upper surface of the display layer 230 regardless of the shape and size of these portions.

Further, with the inkjet method, the first protective film 210 can be directly formed on the upper surface of the display layer 230. There accordingly will be no additional step of, for example, separately preparing the first protective film 210 and bonding it to the display layer 230, making it possible to simplify the manufacturing process (reduce the number of manufacturing steps).

The foregoing described the display apparatus and the manufacturing process of an embodiment of the invention.

The display apparatus 100 may include a reset electrode, in addition, to the partial electrode 330 provided on the writing pen 340. The reset electrode is plate-like in shape, and can cover a relatively wide range of the display face 210a (wider than that covered by the partial electrode 330; for example, the whole surface) when placed on the display face 210a. For example, the reset electrode may be used instead of the writing pen 340, or with the writing pen 340.

With the reset electrode placed on the display face 210a, the whole area of the display face 210a can turn white simply by applying the first voltage between the common electrode 320 and the reset electrode. Similarly, the whole area of the display face 210a can turn black simply by applying the second voltage. In other words, the reset electrode can be used as an eraser erasing the display drawn with the writing pen 340.

Second Embodiment

Second Embodiment of a display apparatus of the present invention is described below.

Figure 7:
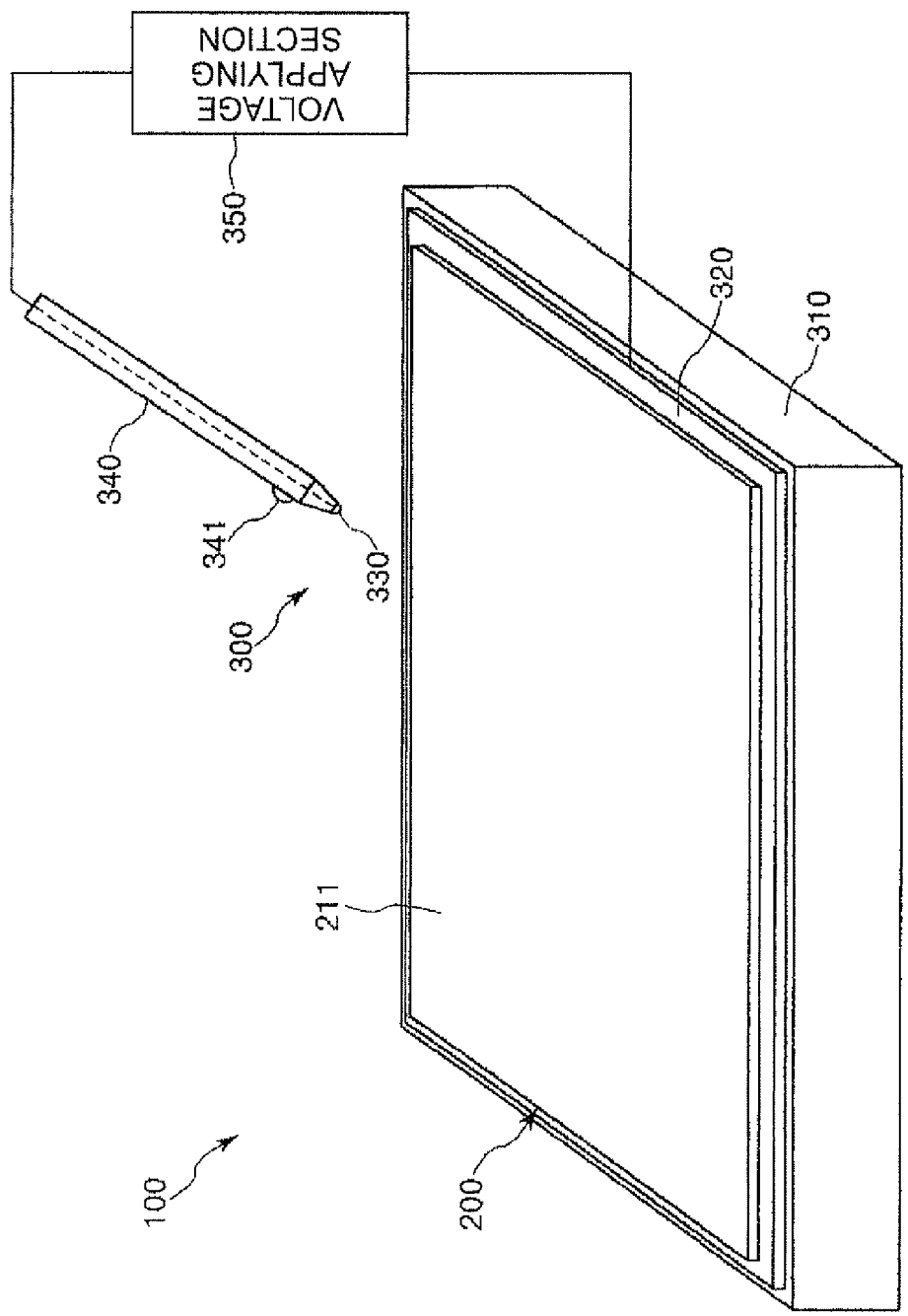
FIG. 7 is a perspective view schematically illustrating Second Embodiment of a display apparatus of the present invention.

FIG. 7 is a perspective view schematically illustrating Second Embodiment of a display apparatus of the present invention.

The following description of Second Embodiment deals with the display apparatus with a primary focus on differences from the foregoing First Embodiment, and matters already described will not be described.

The display apparatus of the present embodiment is not different from that of First Embodiment except that the display unit and the writing unit are separately provided.

As illustrated in FIG. 7, a display apparatus 100 of the present embodiment includes a display sheet 200 and a writing device 300.

The display sheet 200 of the present embodiment has the same configuration as the display sheet 200 of First Embodiment except that the common electrode 320 is omitted. Specifically, the display sheet 200 of the present embodiment is configured to include a second protective film 220, a display layer 230, and a first protective film 210 stacked in this order. The second protective film 220 may be omitted.

The writing device 300 is used to write desired image (for example, patterns, colors, characters, pictures, and combinations of these) on the display sheet 200. As illustrated in FIG. 7, the writing device 300 includes a base 310, a sheet-like (plate-like) common electrode 320 provided on the base 310, a writing pen (input device) 340 having a partial electrode 330 at the tip, and a voltage applying section 350 that applies voltage between the common electrode 320 and the partial electrode 330.

The common electrode 320 also serves as a mount for the display sheet 200, and image is written on the display sheet 200 placed on the common electrode 320. Thus, the common electrode 320 is shaped and sized to cover the display sheet 200 placed on the common electrode 320. In the present embodiment, the common electrode 320 has a planar shape similar to, but slightly larger than, the planar shape of the display sheet 200.

For image writing on the display sheet 200, the display sheet 200 is placed on the common electrode 320, and, after writing (when not writing), the display sheet 200 can be detached from the common electrode 320. That is, the display sheet 200 and the common electrode 320 are separable; in other words, the display sheet 200 is detachably provided with respect to the common electrode 320. As described above, the common electrode 320 is required for writing image on the display sheet 200, but is not necessary for maintaining the image written into it. Thus, by making the common electrode 320 detachable with respect to the display sheet 200 (display layer 230), the display sheet 200 can be made lighter and more compact (thinner).

The display sheet 200 used for the writing by the writing device 300 is an electrophoretic display sheet that displays image by utilizing the electrophoresis of electrophoretic particles. The display sheet 200 includes a display layer 230, a first protective film 210 provided on the upper side of the display layer 230, and a second protective film 220 provided on the lower side of the display layer 230. Specifically, the display sheet 200 of the present embodiment shares the same configuration as the display apparatus 100 of First Embodiment, except that the common electrode 320 is omitted.

The effects obtained in the foregoing embodiment also can be obtained in Second Embodiment.

Third Embodiment

Third Embodiment of a display apparatus of the present invention is described below.

Figure 8:
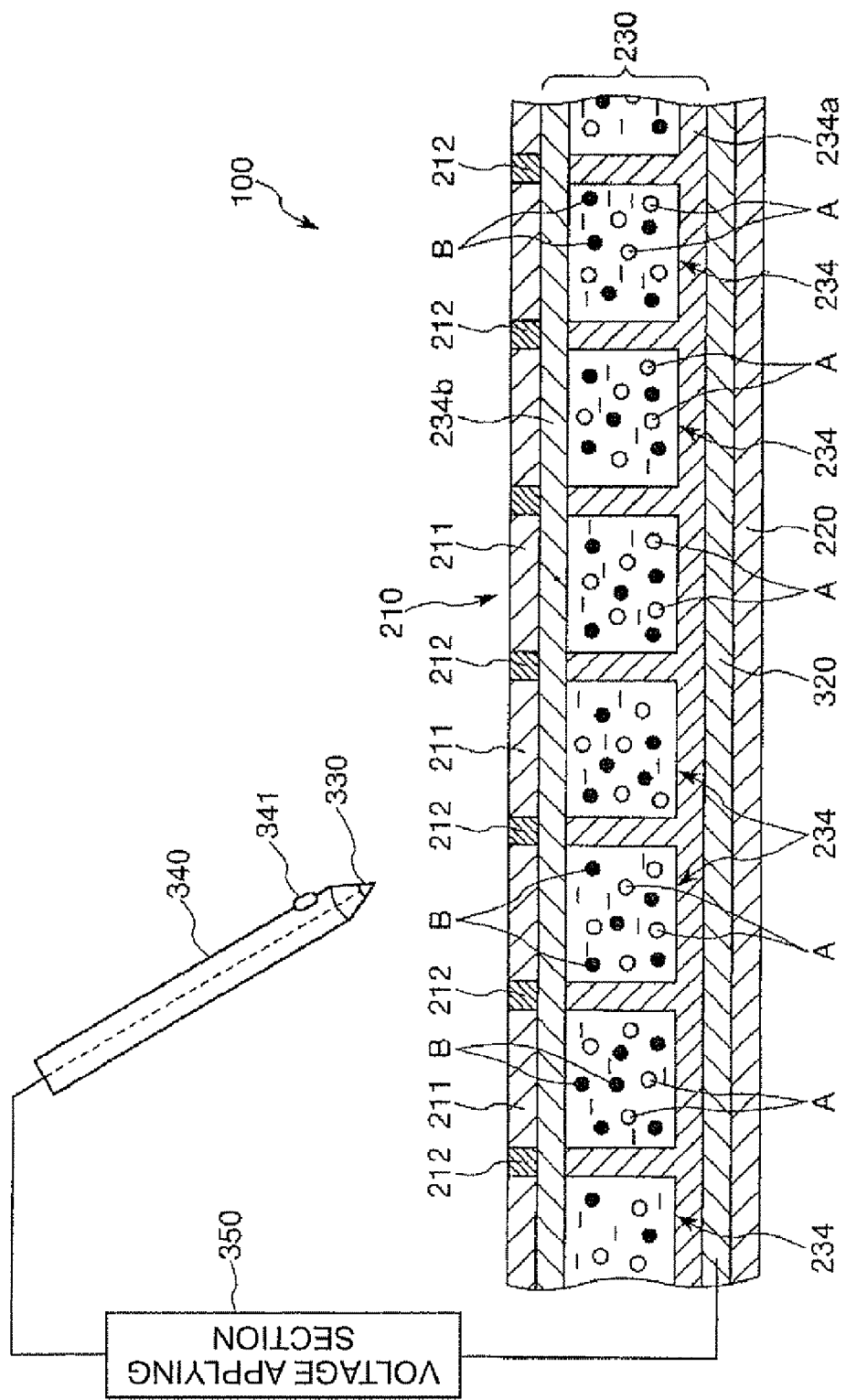
FIG. 8 is a cross sectional view schematically illustrating Third Embodiment of a display apparatus of the present invention.

FIG. 8 is a cross sectional view schematically illustrating Third Embodiment of a display apparatus of the present invention.

The following description of Third Embodiment deals with the display apparatus with a primary focus on differences from the foregoing First Embodiment, and matters already described will not be described.

The display apparatus of the present embodiment is not different from that of First Embodiment except that the display layer 230 is configured differently.

As illustrated in FIG. 8, a display layer 230 provided in a display apparatus 100 of the present embodiment includes a plurality of cells (containers) 234 disposed in a matrix. Each cell 234 is filled with an electrophoresis dispersion liquid (a dispersion of the positively charged particles A and the negatively charged particles B in a liquid-phase dispersion medium 233).

The display layer 230 includes a box unit 234a that has a plurality of depressions (internal space of each cell 234), and a lid 234b provided to cover the opening of each depression of the box unit 234a. The display layer 230 can be formed by filling the depressions of the box unit 234a with an electrophoresis dispersion liquid, and then sealing it with the lid 234b.

The box unit 234a and the lid 234b can be made of materials with a relatively high insulating property. Examples include polyolefin (for example, polyethylene), modified polyolefin, polyimide, thermoplastic polyimide, polyether, polyetheretherketone, various thermoplastic elastomers such as polyurethane and chlorinated polyethylene, and copolymers, blends, and polymers of primarily these materials.

The effects obtained in the foregoing embodiment also can be obtained in Third Embodiment.

Fourth Embodiment

Fourth Embodiment of a display apparatus of the present invention is described below.

Figure 9:
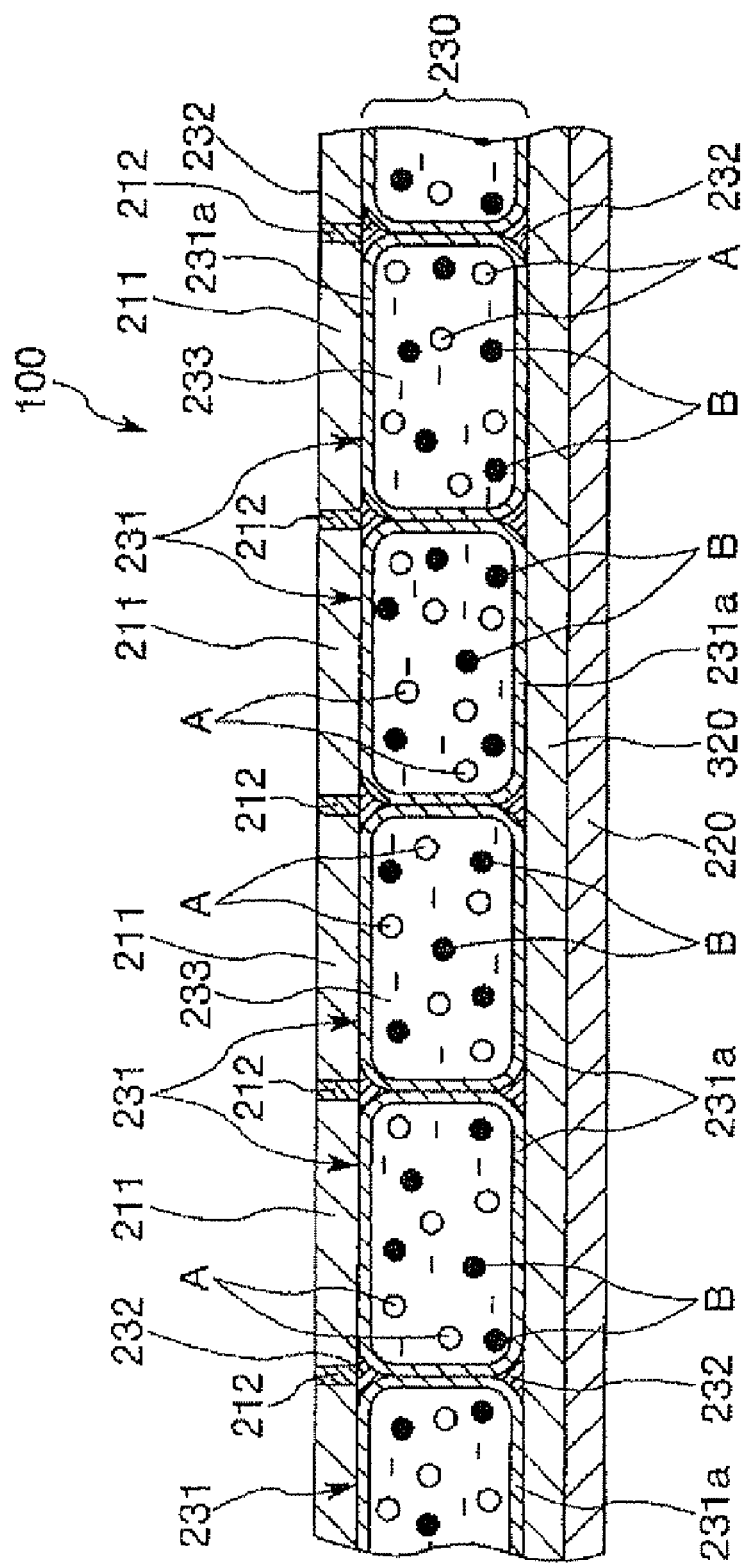
FIG. 9 is a cross sectional view schematically illustrating Fourth Embodiment of a display apparatus of the present invention.

FIG. 9 is a cross sectional view schematically illustrating Fourth Embodiment of a display apparatus of the present invention. In FIG. 9, the voltage applying section 350 and the writing pen 340 are not illustrated for ease of explanation.

The following description of Fourth Embodiment deals with the display apparatus with a primary focus on differences from the foregoing First Embodiment, and matters already described will not be described.

The display apparatus of the present embodiment is not different from that of First Embodiment except that the micro capsules contained in the display layer are shaped differently.

As illustrated in FIG. 9, each micro capsule 231 is vertically compressed by being sandwiched between the first protective film 210 and the common electrode 320, and thus has a flat shape along the horizontal direction. In other words, the micro capsules 231 have a stone-wall structure. This structure affords a wider effective display area and improved contrast for the display apparatus 100. Further, because the positively charged particles A and the negatively charged particles B have less distance to move in the vertical direction, the switching speed of display color can be increased.

The effects obtained in the foregoing embodiment also can be obtained in Fourth Embodiment.

Fifth Embodiment

Fifth Embodiment of a display apparatus of the present invention is described below.

Figure 10:
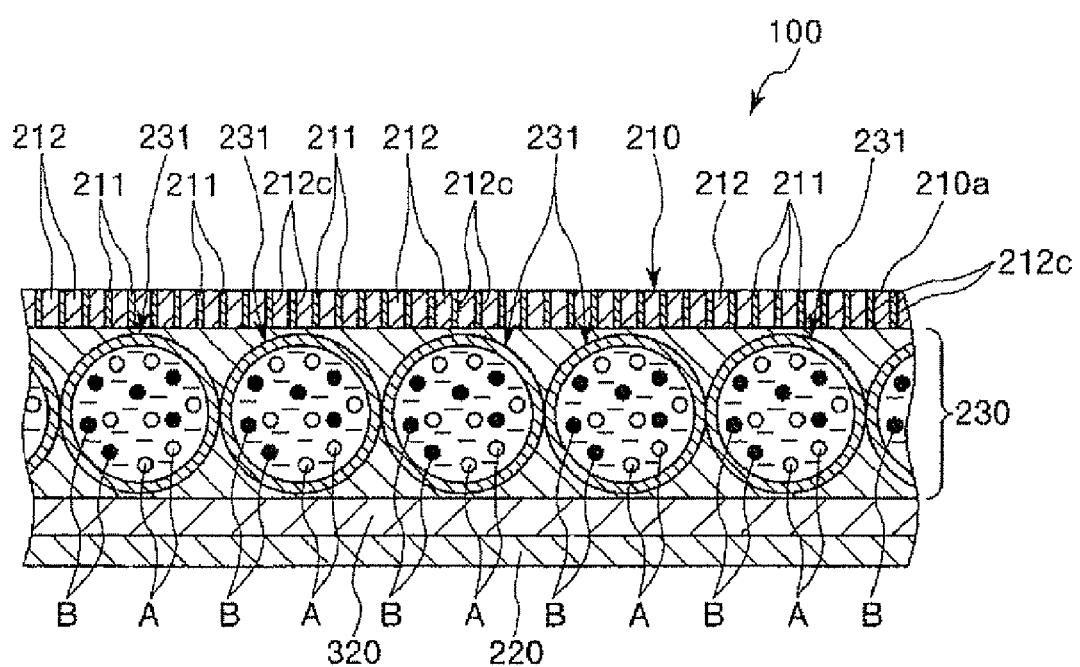
FIG. 10 is a cross sectional view schematically illustrating Fifth Embodiment of a display apparatus of the present invention.
Figure 11:
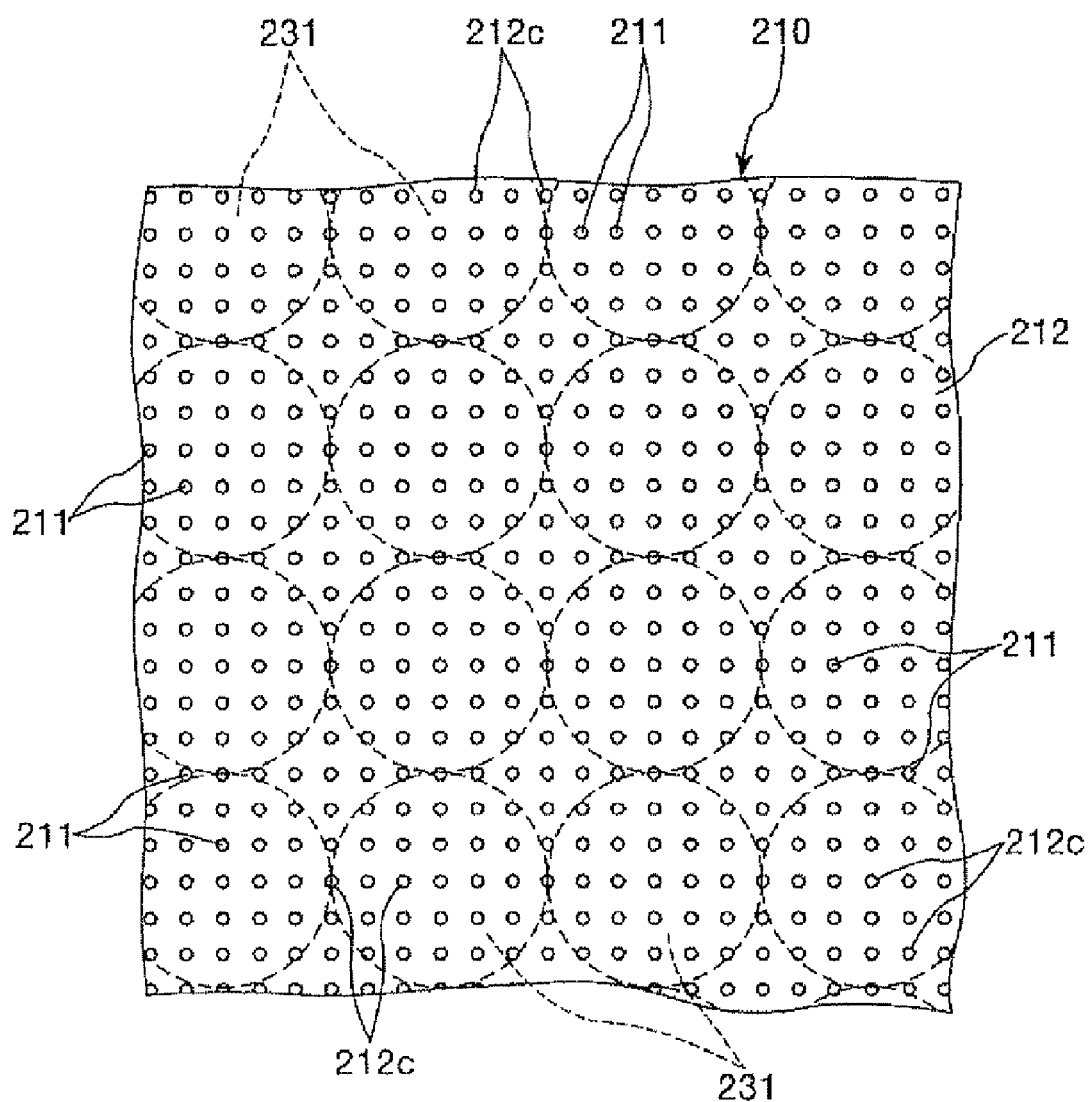
FIG. 11 is a plan view (top view) of the display apparatus illustrated in FIG. 10.

FIG. 10 is a cross sectional view schematically illustrating Fifth Embodiment of a display apparatus of the present invention. FIG. 11 is a plan view (top view) of the display apparatus illustrated in FIG. 10. In the following, for ease of explanation, the upper side and the lower side of FIG. 10 will be referred to as "upper" and "lower", respectively. Further, for convenience, the voltage applying section 350 and the writing pen 340 are omitted in the illustration shown in FIG. 10.

The following description of Fifth Embodiment deals with the display apparatus with a primary focus on differences from the foregoing First Embodiment, and matters already described will not be described.

The display apparatus of the present embodiment is not different from that of First Embodiment except that the first protective film is configured differently.

As illustrated in FIG. 10 and FIG. 11, the first protective film 210 includes a plurality of conductive portions 211, and an insulating portion 212 that insulates the conductive portions 211. The insulating portion 212 is sheet-like in shape, and has a plurality of pores 212c formed through the insulating portion 212 along the thickness direction. The conductive portions 211 are formed in the pores 212c.

The pores 212c are densely and evenly formed throughout the first protective film 210.

Further, the pores 212c are formed so that their diameter is sufficiently smaller than the diameter (average particle size) of the micro capsules 231. The diameter of the pores 212c is not particularly limited as long as it is sufficiently smaller than the diameter (average particle size) of the micro capsules 231, and is preferably 0.1 µm or more and 1 µm or less.

Each micro capsule 231 may cover at least one pore 212c on the plane of the first protective film 210; however, it is preferable that each micro capsule 231 cover at least 10 and at most 200 pores 212c. In this way, current can be efficiently flowed in the micro capsules 231 via the conductive portions 211 formed in the pores 212c, and the adjacent conductive portions 211 can be separated by a distance sufficient for insulation. The first protective film 210 therefore has an excellent insulating property in the planar direction, and excellent conductivity in the thickness direction.

The first protective film 210 (the conductive portions 211 and the insulating portion 212) can be formed using the inkjet method as in First Embodiment. Alternatively, the following method can be used, for example.

For example, heavy ions are bombarded at multiple portions of the insulating portion 212 provided in the form of a polymer film sheet such as PET, so as to form a plurality of narrow ion tracks that extend in the thickness direction of the insulating portion 212. The ion tracks are then treated with an appropriate etchant to form a plurality of through holes (pores 212c) of a nanosized diameter in the insulating portion 212. The conductive portions 211 are then formed in these through holes by, for example, plating. As a result, the first protective film 210 is obtained.

The effects obtained in the foregoing embodiment also can be obtained in Fifth Embodiment.

The display apparatus 100 can be incorporated in various kinds of electronics, for example, such as electronic paper, displays, televisions, video cassette recorders of a view-finder type or a direct-monitor-viewing type, car navigations, pagers, electronic organizers, calculators, electronic newspaper, word processors, personal computers, workstations, video phones, POS terminals, and devices with a touch panel. A display apparatus of the present invention can be used for, for example, the display unit of such electronics.

The invention has been described with respect to certain embodiments of the display apparatus with reference to the accompanying drawings. However, the invention is in no way limited to the foregoing embodiments. For example, a display apparatus of the present invention may be replaced with an apparatus of any configuration with which similar effects can be obtained, or may additionally include any other configurations. Further, the display apparatus may be a combination of any two or more of the configurations (features) of the foregoing embodiments.

The foregoing embodiments described the configurations in which the positively charged particles and the negatively charged particles are movably contained in each container (micro capsule, cell). However, the invention is not limited to this, and, for example, only the positively charged particles or the negatively charged particles may be movably contained.

Further, the foregoing embodiments describes the first protective film that includes a grid-like insulating portion, and a plurality of conductive portions provided in the space defined by the grid. However, the first protective film is not particularly limited, as long as it has lower conductivity in the planar direction than in the thickness direction. For example, the first protective film may be a thin film formed of an insulating material (for example, the same material used for the insulating portion). Such a thin film has an insulating property. However, because a current flow in the thickness direction cannot be completely prevented because of the thin thickness, current can be flowed in the thickness direction while preventing it from flowing in the planar direction.

What is claimed is:

1. A display apparatus comprising:
   an electrode layer being applied a voltage by a voltage applying section;
   a display layer that is provided above the electrode layer, and that includes a plurality of containers, each of the plurality of containers containing at least one of positively charged first particles and negatively charged second particles;
   a film provided above the display layer; and
   a movable electrode portion capable of applying voltage to part of a region of the display layer through the film,
   the film being a conductive film having lower conductivity in a planar direction of the film than in a thickness direction of the film,
   the movable electrode being applied a voltage by a voltage applying section that passes through the film to the electrode layer, and
   the film including a plurality of conductive portions and an insulating portion, an area of the plurality of conductive portions being larger than an area of the insulating portion at a display region.

2. The display apparatus according to claim 1, wherein the conductive film has an insulating property in the planar direction of the film.

3. The display apparatus according to claim 1, wherein the conductive film includes the plurality of conductive portions having conductivity, each of the plurality of conductive portions being provided separately, and the insulating portion that has an insulating property and that is provided between the plurality of conductive portions so as to insulate each of the plurality of conductive portions from each other.

4. The display apparatus according to claim 3, wherein the plurality of conductive portions are provided in a matrix.

5. The display apparatus according to claim 3, wherein the insulating portion forms a grid, and wherein the plurality of conductive portions is provided in a plurality of spaces formed by the insulating portion.

6. The display apparatus according to claim 3, wherein each of the plurality of conductive portions have a portion exposed from a display sheet to outside.

7. The display apparatus according to claim 1, wherein the plurality of conductive portions correspond to the plurality of containers one to one.

8. The display apparatus according to claim 1, wherein:
   the film includes a first conductive portion and a second conductive portion that are made of a first material and separately provided from each other, and a third conductive portion that is made of a second material different from the first material and that is disposed between the first conductive portion and the second conductive portion,
   wherein the first conductive portion and the second conductive portion have higher conductivity than the third conductive portion.

9. The display apparatus according to claim 1, wherein the film is light transmissive.

10. The display apparatus according to claim 1, wherein the containers are capsules.

11. The display apparatus according to claim 1, wherein the display layer and the electrode layer are separable from each other.

12. The display apparatus according to claim 1, wherein the electrode portion is provided at an apex portion of a pen-type input device.

13. The display apparatus according to claim 1, further comprising a voltage applying section that applies DC voltage between the electrode layer and the electrode portion.

14. A display sheet comprising:
   a display layer including a plurality of containers containing at least one of positively charged first particles and negatively charged second particles; and a film provided on the display layer, wherein the film includes:
  a plurality of conductive portions that receives an applied voltage from a movable electrode portion, and
  an insulating portion that is provided between the plurality of conductive portions, the insulating portion being configured to insulate the plurality of conductive portions from each other, and an area of the plurality of conductive portions being larger than an area of the insulating portion at a display region,
wherein the film passes through the applied voltage from a first surface of the film to a second surface of the film opposite the first surface.

15. The display apparatus according to claim 1, wherein the film is disposed between a display surface of the display apparatus and the display layer.

* * * * *